R. E. HELLMUND, H. R. MEYER & A. H. CANDEE.
SYSTEM OF CONTROL FOR SINGLE PHASE COMMUTATOR MOTORS.
APPLICATION FILED APR. 12, 1916.
1,276,913.
Patented Aug. 27, 1918.
2 SHEETS—SHEET 1.
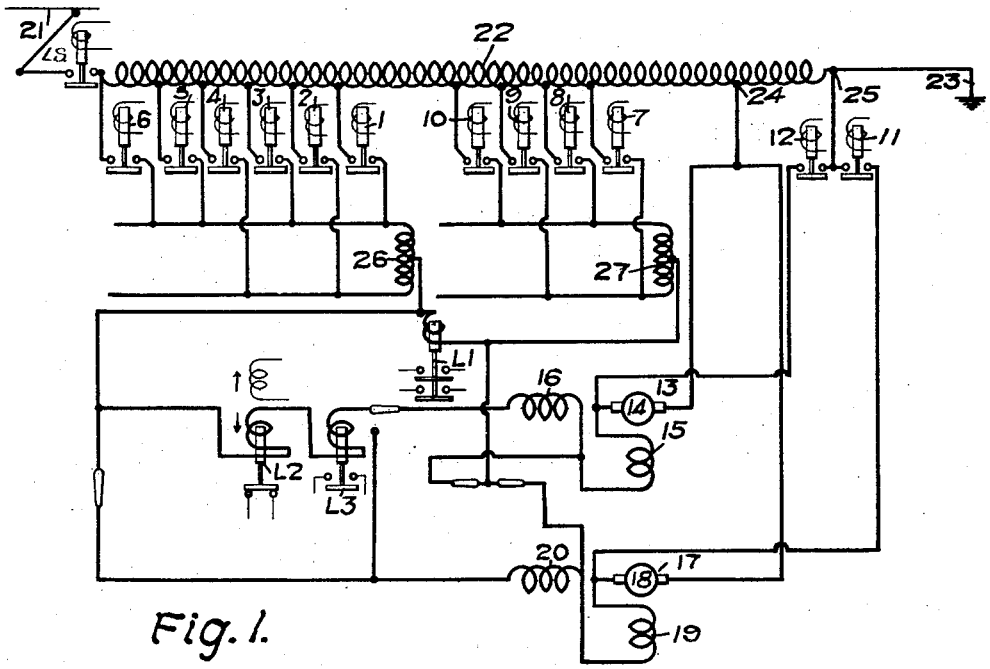
Fig. 1.
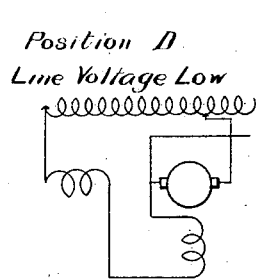
Position A
Line Voltage Low
Fig. 5.
| Step | Switches |||||||||||||
|---|---|---|---|---|---|---|---|---|---|---|---|---|
| | LS | 1 | 2 | 3 | 4 | 5 | 6 | 7 | 8 | 9 | 10 | 11 | 12 |
| A | O | O | O | | | | | | | | | O | O |
| B | O | | O | O | | | | | | | | O | O |
| C | O | | | O | O | | | | | | | O | O |
| D | O | | | O | O | | | O | O | | | | |
| E | O | | | | O | O | | O | O | | | | |
| F | O | | | | | O | O | O | O | | | | |
| G | O | | | | | O | O | | O | O | | | |
| H | O | | | | | | O | O | | O | O | | |
Fig. 2.
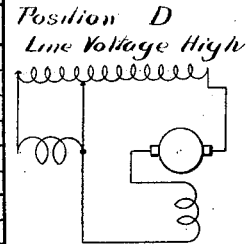
Position D
Line Voltage High
Fig. 6.
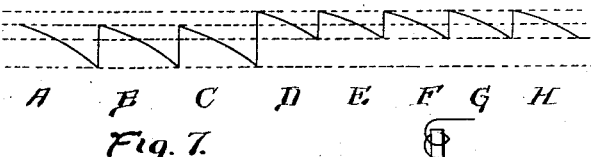
A B C D E F G H
Fig. 7.
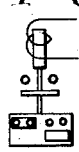
Fig. 3.
WITNESSES:
INVENTORS
Rudolf E. Hellmund,
Harry R. Meyer &
Andrew H. Candee.
BY
ATTORNEY

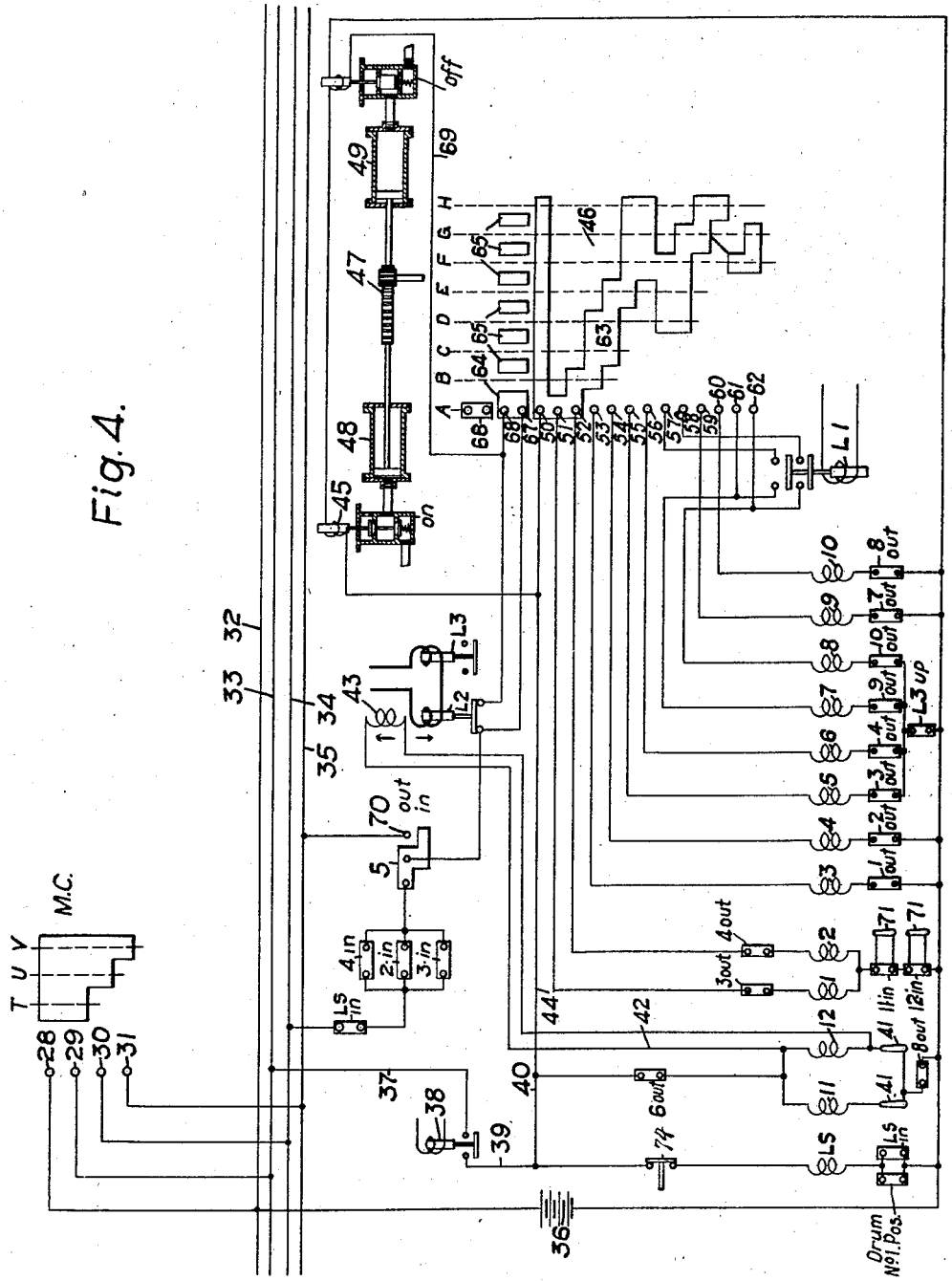

UNITED STATES PATENT OFFICE.

RUDOLF E. HELLMUND, OF PITTSBURGH, HARRY R. MEYER, OF WILKINSBURG, AND ANDREW H. CANDEE, OF PITTSBURGH, PENNSYLVANIA, ASSIGNORS TO WESTINGHOUSE ELECTRIC AND MANUFACTURING COMPANY, A CORPORATION OF PENNSYLVANIA.

SYSTEM OF CONTROL FOR SINGLE-PHASE COMMUTATOR-MOTORS.

1,276,913.　　　　　Specification of Letters Patent.　　Patented Aug. 27, 1918.

Application filed April 12, 1916.　Serial No. 90,705.

*To all whom it may concern:*

Be it known that we, RUDOLF E. HELLMUND, a subject of the German Emperor, and a resident of Pittsburgh, in the county of Allegheny and State of Pennsylvania, HARRY R. MEYER, a citizen of the United States, and a resident of Wilkinsburg, in the county of Allegheny and State of Pennsylvania, and ANDREW H. CANDEE, a citizen of the United States, and a resident of Pittsburgh, in the county of Allegheny and State of Pennsylvania, have invented a new and useful Improvement in Systems of Control for Single-Phase Commutator-Motors, of which the following is a specification.

Our invention relates to control systems for single-phase commutator motors of the compensated or cross field type and it has for its object to provide a system that shall enable a motor of the type designated to be accelerated with ample torque and with favorable commutating conditions under widely varying loads and line voltage.

In the accompanying drawing, Figure 1 is a diagrammatic view of a pair of single-phase compensated commutator motors, together with their attendant supply circuits and control switches, constructed in accordance with our invention; Fig. 2 is a sequence chart of well known character illustrating the sequence of operation of the switches in Fig. 1 when operated in accordance with our invention; Fig. 3 is a diagrammatic view of an electro-magnetic switch provided with an auxiliary control board of well known type as employed in connection with our system; Fig. 4 is a diagrammatic view of a preferred combination of control circuits for operating the switches of Fig. 1 in accordance with the chart of Fig. 2, Figs. 5 and 6 are simplified diagrammatic views illustrative of certain phases of the accelerating sequence; and Fig. 7 is a diagram illustrating effect of the double limit switch setting upon the accelerating step.

In the operation of electric railway systems upon single-phase alternating-current supply circuits, it is customary in some instances to provide the railway vehicles with single-phase driving motors of the compensated commutator type, said motors being connected for repulsion or reverse doubly-fed operation at the start and for subsequent normal doubly-fed operation, wherein the armature and main field windings are connected across one portion of the supply voltage and the cross field winding is connected across another portion thereof. By this means, an extremely flexible and effective control of the voltages and currents in the different portions of the motor circuits is obtainable.

It has been customary in the past, with both manual and automatic systems of operation, to effect the transition from repulsion or reverse doubly-fed to normal doubly-fed operation at a predetermined step or point in the accelerating sequence and systems of this character operate successfully where both the load and the line voltage are substantially uniform. When, however, the line voltage is subject to violent fluctuations, it is sometimes impossible when said voltage is at a low value to start a vehicle until the controller has been moved forward to a doubly-fed position and a start under these conditions is attained with violent sparking because of the absence of a rotational electromotive force in the short circuited armature coils undergoing commutation and also because of the absence of the inherently more or less perfect compensation present in a motor of the repulsion type.

By our invention, we provide means whereby a motor of the character designated is started with repulsion or reverse doubly-fed connections, under all conditions of line voltage, and whereby the change-over to normal doubly-fed operation can be made only when the load current has fallen to a predetermined value and when the effective armature voltage exceeds a predetermined amount. It should be understood that it is not essential that a motor be started by a repulsion or reverse doubly-fed connection, it being entirely feasible to start with a small voltage across the armature in the normal direction and to effect the change-over by merely shifting the tap to the other side of the main or torque field winding, thus transferring the main field winding from the cross field to the armature circuit. In fact, this transfer of the main field is the criterion of the change-over operation rather than the location of the intermediate tap in the transformer winding.

Another feature of our invention comprises providing means whereby when the motor is operating at high speed with very light load, as, for example, when descending grades, the armature voltage is abnormally increased and the cross-field voltage is abnormally decreased with respect to the values ordinarily supplied, thus providing for suitable commutation under the somewhat abnormal conditions of operation.

Our system is similar in its broader aspects to a copending application of R. E. Hellmund and H. T. Morris, Serial No. 83,744, filed March 13, 1916, in that automatic acceleration from non-doubly-fed to doubly-fed acceleration is obtained by a current-limit switch but differs from the system of said copending application in that a voltage limit is also employed so that the change-over to doubly-fed operation is not obtained unless the supply voltage is suitable. The present system also provides means whereby the current increments are less in the latter steps of the acceleration than in the early steps, this result being obtained by automatically changing the setting of the current-limit switch.

Referring to the drawing for a more detailed understanding of our invention, we show a pair of motors of the compensated commutator type at 13 and 17 in Fig. 1. Said motors comprise respectively armatures 14 and 18, main field windings 15 and 19 and cross field windings 16 and 20. Energy for the operation of the motors 13 and 17 is derived from any suitable source, such, for example, as a trolley 21 supplying an auto-transformer 22 connected to ground at 23, as is customary in railway supply systems. The motors 13 and 17 may be connected for repulsion operation at starting, that is to say, the armatures may be directly short circuited but it is preferable, for proper commutation, to impose thereupon a small reversed electromotive force by initially connecting the inner armature brushes to a point in the transformer 22 outside of the normal outer tap, thus establishing what may be termed the reverse doubly-fed connection as fully described in an article entitled "Single phase commutator motors" by R. E. Hellmund and J. V. Dobson, page 112, et seq. of the "*Electric Journal*" for March 1916. With this object in view, the right hand brushes of the motors 13 and 17 are permanently connected to the source 22 at a point 24 and the inner or left hand brushes of the motors 13 and 17 may be connected to a point 25 to the right of the tap 24 by closing suitable electromagnetic switches 11 and 12. The main field windings 15 and 19 are connected between the armatures and the respective cross-field windings and the voltage applied to the outer terminals of the cross-field windings may be adjusted by the manipulation of suitable control switches 1 to 6, inclusive, and of a preventive device 26. In like manner, the voltage applied to an intermediate tap connected to the inner cross-field terminal may be adjusted by the manipulation of suitable switches 7 to 10, inclusive, and of a preventive device 27. Current limit switches L2 and L3 are inserted in the cross field supply main and are preferably provided with adjustable setting devices whereby they may be arranged to fall with varying amounts of load current. A voltage limit switch L1 is connected across the cross field winding and is therefore operable in accordance with the effective armature voltage because of the transformer relation existing between the armature and cross field windings.

All of the control switches 1 to 12, inclusive, are preferably of the well known control board type shown in Fig. 3 whereby interlocking may be readily effected as desired for automatic acceleration.

In order to operate the switches of Fig. 1 in a predetermined sequence, we provide a control system of the character indicated in Fig. 4. A master controller MC is arranged to have three operating positions T, U and V in which contact is made in appropriate sequence with contact fingers 28, 29, 30 and 31, and thence to train-line conductors 32, 33, 34 and 35. The train-line conductor 32 is connected to one pole of a supply battery 36. The train-line conductor 33 is connected through conductor 37 and a line relay 38 to the energizing coils of the line switch LS and of the main control switches 11 and 12 via conductors 39 and 40. The limit switch LS is included in circuit with an overload trip 74 and with interlocks, "drum No. 1 position" and LS—in, the two latter interlocks being in parallel with each other for a purpose to be hereinafter more fully pointed out. The operating coils 11 and 12 are connected in series with interlocks 6—out and 8—out and with suitable cutout switches 41—41. Suitable conductors 42—42 connect a differential winding 43 on the limit switch L2 in parallel with the actuating winding of the switch 12. A conductor 44 connects the conductor 40 with the operating coil 45 of the "on" valve of a balanced pressure operating or "PK" control device of well known type similar to that described on page 970 et seq. of the "*Electric Journal*" for 1913. (Vol. 10.) In its essence, said control device comprises a control drum 46 (shown in development), said drum being rotatable by means of a rack and pinion 47, said rack being movable by reason of differences of pressure existing in suitable cylinders 48 and 49 which may have air or other operating medium admitted thereto by means of the electromagnetically operated valves designated respectively as "on" and "off". As shown, the energization of the winding 45 of the "on" valve operates the same to admit air to the cylinder 48 whereas the energization of the winding of the "off" valve permits the escape of air from the cylinder 49. Conversely, the deenergization of the winding 45 permits the escape of air from the cylinder 48 and admits air to the cylinder 49. The conductor 44 likewise leads to a contact finger 50 on the "PK" drum and said contact finger serves to energize the main contact segments 63 of the "PK" drum throughout the accelerating process. The "PK" drum is further provided with auxiliary segments 64 and 65 for suitably notching forward the same and also with an auxiliary segment 66 for the initial energization of the line switch.

The train-line conductor 34 is connected through an interlock LS—in and the interlocks 4—in, 2—in and 3—in in parallel and through an interlock 5—out, to the left hand contact stud of the current-limit switch L2, as shown. The left hand contact stud of the limit switch L2 is further connected to a contact finger 67 bearing on the segment 64 and, in like manner, the right hand contact stud of the limit switch L2 is connected to a contact finger 68 bearing on the segment 64. Said two last named contact members are also in connection with the operating coil of the "off" valve magnet by means of a conductor 69.

The train line conductor 35 is connected to a contact stud 70, so arranged as to energize the contact studs of the limit switch L2 when the switch 5 is closed.

The "PK" sequence drum 46 is provided with suitable control fingers 51 to 62, respectively, adapted to coact therewith, and the function of these fingers is as follows: 51 and 52 energize the operating coils of switches 1 and 2 through interlocks 3—out and 4—out, as shown, and also through interlocks 11—in and 12—in shunted by suitable cutout switches 71—71. The finger 53 energizes the winding of the switch 3 through the interlock 1—out and, in like manner, 54 energizes the switch 4 through the interlock 2—out. The switches 5 and 6 are energized from fingers 55 and 56 through the interlocks 3—out, 4-out and L3—up, as shown. The operating coils of the switches 7 and 8 are energized from the fingers 57 and 58 through the upper and lower contact members respectively of the voltage limit switch L1 and also through the limits 9—out, 10—out and L3—up. Contact fingers 59 and 60 energize the windings of the switches 9 and 10 through interlocks 7—out and 8—out. The contact fingers 61 and 62 are connected to energize the windings of the switches 7 and 8 directly without the interposition of the contacts of the voltage limit switch L1.

The above described control system is devoid of many details such, for example, as the motor reversing mechanism which, while essential to commercial operation, are not essential to an understanding of the present invention and would serve to confuse rather than to aid in an understanding of the disclosure.

Having thus described the arrangement of a system embodying our invention, the operation is as follows. Assuming that the line voltage is present so that the line relay 38 is closed, the master controller is moved to the initial position T for the energization of the segments thereof and for the energization of the contact finger 29 and of the train line 33. Current flows through the conductor 37, the contacts of the line relay 38 and the line 39, closing the line switch LS and also the switches 11 and 12. The current for the energization of the line switches flows through the interlock designated "drum No. 1 position" which is shown at 66 on the "PK" drum and, as soon as the line switch is closed, it establishes holding circuits for itself through the interlock LS—in. The energization of the main segment 63 of the "PK" drum from the finger 50, which is in connection with the line 40 through the line 44, causes the energization of the fingers 51 and 52, closing the switches 1 and 2, thus completing the connections indicated in step A of Fig. 2 and starting the motors 13 and 17 with a reverse doubly-fed connection, although as above stated, a start of the ordinary repulsion type might be made by causing the switches 11 and 12 to close short circuits across the armatures 14 and 18. The operating coil of the "on" valve is simultaneously energized, admitting air to the cylinder 48 but not operating the drum 46 as the operating coil of the "off" valve is deenergized and hence air pressure is being admitted to the cylinder 49, resulting in pressure equilibrium.

The movement of the master controller to the position U energizes the train line 34 and current flows via the interlocks LS—in, 2—in, 5—out and the control segment 64 of the "PK" drum through the conductor 69 to the operating coil of the "off" valve, releasing air pressure from the cylinder 49 and permitting the cylinder 48 to advance the drum to the position B. The passing of the control fingers 67 and 68 from the segment 64 deënergizes the "off" valve magnet and readmits air to the cylinder 49, thus stopping the drum on the position B in a well understood manner. The finger 51 is now deënergized and the finger 53 is energized, thus opening the switch 1 and closing the switch 3, although said switches are directly interlocked as shown, in order to absolutely prevent the possibility of a short circuit across a portion of the transformer winding. The manipulation of the switches 1 and 3 thus performed serves to raise the motor voltage.

When the back electromotive force of the accelerating motors reduces the load current to a value below the setting of the current limit switch L2, the latter falls, energizing its right hand contact member and permitting current flow to the conductor 69, again energizing the "off" valve magnet and advancing the control drum 46 to the position "C", whereby the switch 2 is opened and the switch 4 closed, current continuing to be supplied from the train-line 34 through the interlock 4—in.

The time has now arrived for the transition from reverse doubly-fed to straight doubly-fed operation or, in other words, for the transfer of the main field winding from the cross field to the armature circuit, provided the line voltage is sufficiently high. The current limit switch L2 falls, advancing the "PK" drum to the position D and energizing the fingers 57 and 58. If the line voltage is higher than a predetermined minimum value, the voltage limit switch L1 is in its upward or closed position and the switches 7 and 8 are closed, establishing the first intermediate tap for doubly-fed operation and the reverse doubly-fed connection through the switches 11 and 12 is broken by reason of the inclusion of the interlock 8—out in their energizing circuits.

If, however, the line voltage is below the setting of the limit switch L1, nothing occurs on the "D" position of the "PK" drum and said drum moves forward to the position E, opening the switch 3 and closing the switch 5, still further raising the motor voltage with respect to the line voltage. At this stage, the master controller should have been advanced to the position V in order to energize the train line 35 so that the opening of the switch 4 upon the movement of the "PK" drum to the position F does not deprive the contact members of the current limit switch L2 of current.

It is desirable that the doubly-fed connection be established under all conditions at the sixth notch of the "PK" drum, designated as F, and, for this purpose, contact is then made with fingers 61 and 62, energizing the supply conductors of the switches 7 and 9 beyond the contact members of the voltage limit switch L1 and thus eliminating the action of the latter.

The subsequent movement of the "PK" drum to the positions G and H serves merely to close the switches 9 and 10, thus still further raising the armature voltage and reducing the cross-field voltage.

It is desirable that the main current limit switch L2 be given a higher setting during doubly-fed operation than during the initial operation, whether the latter be of the repulsion or of the reverse doubly-fed type, and for this purpose, the auxiliary winding 43 is applied thereto and is connected in multiple to the energizing windings of the switches 11 and 12, as shown. The auxiliary winding 43 may either be differentially wound with respect to the main winding of the limit switch L2 for the neutralization of some of the magnetism thereof, or as is preferable, it may serve to lift a small auxiliary weight from the armature of the limit switch L2. Thus, when the switches 11 and 12 are closed, that is to say, during the initial starting operation, the armature of the current limit switch L2 is relatively light and said switch has in effect a low limit setting, whereas, after the switches 11 and 12 are opened, that is to say, during normal doubly-fed operation, the winding 43 is deenergized and the auxiliary weight rests upon the armature of the limit switch L2, causing the latter to fall with much heavier load currents than was previously the case.

While we have shown our invention in its preferred forms, it will be obvious to those skilled in the art that it is susceptible of various minor changes and modifications without departing from the spirit thereof and we desire therefore that only such limitations shall be placed thereupon as are imposed by the prior art or are indicated in the appended claims.

We claim as our invention:

1. The combination with a source of alternating current, of an alternating current motor of the compensated commutator type, means for initially connecting the terminals of said motor to said source and for connecting the inner armature terminal thereof for reverse doubly-fed operation, means for thereafter increasing the voltage applied to said motor for the acceleration thereof, and means for automatically changing over for doubly-fed operation when the load current falls to a predetermined value if the line voltage exceeds a predetermined value.

2. The combination with a source of alternating current, of an alternating current motor of the compensated commutator type, means for initially connecting the terminals of said motor to said source and for connecting the inner armature terminal thereof for reverse doubly-fed operation, means for thereafter increasing the voltage applied to said motor for the acceleration thereof, and means for automatically changing over for doubly-fed operation when the load current falls to a predetermined value if the voltage across the cross field winding exceeds a predetermined value.

3. In a system of automatic acceleration for alternating current motors of the compensated commutator type arranged for other than straight doubly-fed start and for subsequent straight doubly-fed operation the combination with a limit switch arranged to drop when the current falls below a predetermined amount and means controlled thereby to accelerate said motor, of an additional limit switch arranged to drop when the effective armature voltage of said motor falls below a predetermined amount and means dependent upon the joint action of said two limit switches for changing-over said motor to straight doubly-fed operation.

4. In a system of automatic acceleration for alternating current motors of the compensated commutator type arranged for other than straight doubly-fed start and for subsequent straight doubly-fed operation, the combination with a limit switch arranged to drop when the current falls below a predetermined amount and means controlled thereby to accelerate said motor, of an additional limit switch arranged to drop when the effective armature voltage of said motors falls below a predetermined amount, and means operative only when said current limit switch is in its lower position and said voltage switch is in its raised position for changing-over said motor to doubly-fed operation.

5. In a system of automatic acceleration for alternating current motors of the compensated commutator type arranged for other than straight doubly-fed start and for subsequent straight doubly-fed operation, the combination with a switching device, of a balanced pressure operating mechanism for operating said device in accordance with the motor current, and a switching mechanism operable in accordance with the effective armature voltage of said motor for modifying the action of said switching device.

6. In a system of automatic acceleration for alternating current motors of the compensated commutator type arranged for other than straight doubly-fed start and for subsequent straight doubly-fed operation, the combination with a switching device for controlling the voltage supplied to said motor, of a balanced pressure operating mechanism for operating said device in accordance with the motor current, and a switching mechanism operative in accordance with the effective armature voltage of said motor, during a portion only of the accelerating process, and arranged to modify the action of said switching device.

7. In a system of automatic acceleration for alternating current motors of the compensated commutator type arranged for other than doubly-fed start and for subsequent doubly-fed operation, the combination with a switching device arranged to accelerate said motor and to change-over to doubly-fed operation at a predetermined stage in the accelerating process, of a balanced pressure operating mechanism therefor and switching means operable in accordance with the effective armature voltage of said motor for retarding said change-over in said voltage is abnormally low.

8. The combination with a source of alternating current, of an alternating current motor provided with both main and cross field inducing windings, and means for inserting at least a portion of said main field winding in circuit with either the cross field or the armature of said motor, said means being operative to change over from said cross field to said armature connection when the load current diminishes to a predetermined value if, at the same time, the voltage across a portion of the motor circuit exceeds a predetermined value.

9. The combination with a source of alternating current, of an alternating current motor of the cross-field commutator type, connection therebetween, means for altering said connection so that at least a portion of the main field winding of said motor may be transferred from a motor circuit carrying a relatively large share of the motor current to a motor circuit carrying a relatively small share of the motor current, and means whereby said change over is rendered subject solely to the motor load current during certain stages of the motor acceleration and is rendered subject to the joint control of the motor current and voltage in other stages of the motor acceleration.

10. The combination with a source of alternating current, of an alternating current motor of the cross-field commutator type, connections therebetween, means for altering said connection so that at least a portion of the main field winding of said motor may be transferred from the cross-field circuit to the armature circuit, and means whereby said change over is rendered subject solely to the motor load current during certain stages of the motor acceleration and is rendered subject to the joint control of the motor current and of the voltage across a portion of the motor circuit in other stages of the motor acceleration.

In testimony whereof, we have hereunto subscribed our names this 31st day of March, 1916.

RUDOLF E. HELLMUND.
HARRY R. MEYER.
ANDREW H. CANDEE.